United States Patent [19]

Kasting et al.

[11] 4,324,213
[45] Apr. 13, 1982

[54] LUBRICATION FLUID FILTERING AND COOLING ASSEMBLY

[75] Inventors: Edward W. Kasting, Seymour; Richard E. Glasson; Roy J. Primus, both of Columbus, all of Ind.

[73] Assignee: Cummins Engine Company, Inc., Columbus, Ind.

[21] Appl. No.: 113,698

[22] Filed: Jan. 21, 1980

[51] Int. Cl.³ .............................................. F01M 1/00
[52] U.S. Cl. ............................... 123/196 A; 184/6.22; 165/51
[58] Field of Search ....................... 123/196 A, 196 R; 184/6.22; 165/51, 119

[56] References Cited

U.S. PATENT DOCUMENTS

| | | | |
|---|---|---|---|
| 2,623,612 | 12/1952 | Scheiterlein | 184/104 R |
| 2,966,269 | 12/1960 | Allen | 123/196 A |
| 3,223,197 | 12/1965 | Conover et al. | 184/6 |
| 3,561,417 | 2/1971 | Downey | 123/196 A |
| 3,741,342 | 6/1973 | Maddalozzo | 123/196 A |
| 3,777,847 | 12/1973 | Lawless | 123/196 R |
| 3,830,289 | 8/1974 | Olson | 165/51 |
| 4,207,944 | 6/1980 | Holtz et al. | 165/82 |

FOREIGN PATENT DOCUMENTS

| | | |
|---|---|---|
| 584174 | 1/1947 | United Kingdom . |
| 1081991 | 9/1967 | United Kingdom . |
| 1297941 | 11/1972 | United Kingdom . |
| 1355503 | 6/1974 | United Kingdom . |

OTHER PUBLICATIONS

Shop Manual, NH/NT 855 C.I.D. Engines, copyright Apr. 1978, Cummins Engine Company, Inc. pp. 7.4-7.5.

Primary Examiner—Charles J. Myhre
Assistant Examiner—E. Rollins Cross
Attorney, Agent, or Firm—Sixbey, Friedman & Leedom

[57] ABSTRACT

A compact lubrication fluid filtering and cooling assembly including a bracket (16) for simultaneously mounting a pair of lubrication filters, (12 and 14) and a lubrication fluid cooler (10) on the block (4) of an internal combustion engine equipped with an internally contained lubrication circuit and providing fluid connection therewith. The bracket (16) provides a plurality of fluid flow passages (30, 77, 80, 88 and 91a) whereby lubrication fluid is conducted from the main engine oil discharge port (24) into bracket (16) into a first discharge port (26) leading to filter (12) from which oil is returned to the bracket for delivery to cooler (10), and from cooler (10) back through bracket (16) to the main return port on the engine block. At the same time, a predetermined amount of lubrication fluid is diverted through a bleed passage (30) to an auxiliary filter (14) and then conveyed through a flow passage (80) in bracket (16) to an auxiliary port (81) which communicates with an auxiliary inlet port (82b) formed on the engine block. Cooler (10) includes a hollow shell (45) in which a plurality of spaced coolant tubes are supported by a pair of support plates (50, 51) positioned at opposite ends of the shell and secured to hollow shell (45) to form a fluid tight seal. End caps (60, 62) are joined to hollow shell (45) in a manner to prevent the nondestructive disassembly of cooler (10) and require its replacement during engine maintenance or overhaul. Cooler (10) is mounted on bracket (16) in an offset position with respect to its central longitudinal axis to form a compact cooler/filter assembly in a manner which does not unduly complicate the internal flow passages (30, 77, 80, 88 and 91a) contained within the bracket (16).

17 Claims, 6 Drawing Figures

LUBRICATION FLUID FILTERING AND COOLING ASSEMBLY

DESCRIPTION

1. Technical Field

The present invention relates to lubrication oil filtering and cooling systems for internal combustion engines. In particular, the present invention relates to a replaceable oil cooler and mounting bracket which provides the sole support for a pair of engine oil filters and the replaceable oil cooler.

2. Background Art

The advantages of both filtering and cooling the lubrication oil of an internal combustion engine have long been recognized. Previously known systems, however, have generally been extremely complicated structurally and have often required separate flow pipes mounted externally of the engine block. Within systems employing separate main and bypass filters, several interconnecting exterior conduits are generally required, such as illustrated in U.S. Pat. No. 3,561,417, unless specialized mounting structure with internalized flow conduits is employed, such as that illustrated in U.S. Pat. No. 3,223,197. When the flow conduits are mounted exteriorly, the possibility of oil or coolant loss from a joint leak or damaged line becomes very real. On the other hand, specialized mounting brackets having internalized flow passages can become extraordinarily complex especially when more than a single oil filter is employed in the lubrication oil circuit.

The overall size of the cooler/filter assembly is also of major concern to the engine manufacturer since the cross-sectional profile of the engine, including its components, must be minimized to allow the engine to be positioned within a limited space as required in many engine applications. In view of this and other conflicting requirements it is not surprising that no single design for an oil cooler/filter assembly known heretofor has simultaneously achieved the desired low cost and simplicity while also providing a compact assembly and reasonable assurance against oil loss due to leakage and/or external line damage.

With respect to the oil cooler itself, engine manufacturers have been plagued by the need to deal with the effects of contaminant buildup within the tube bundle which forms the heat exchange flow paths for the engine oil and coolant inside the cooler. To properly clean such tube bundles, toxic chemicals (such as oakite or alkaline solution on the oil side and muriatic acid, oxalic acid and pyridene on the coolant side) must be employed in accordance with a carefully described procedure. See, for example, pages 7-4 and 7-5 of "NH/NT 855 C.I.D. Engines Shop Manual", Copyright 1978 by Cummins Engine Company, Inc., assignee of the present invention. Despite the use of this cleaning procedure, potentially damaging contaminants may remain within the tube bundle. For example, certain engine failures are attended or triggered by the disintegration of bearings or other engine components which cause metal particles to be circulated through the lubricating system. Some of these particles are likely to become lodged in the tube bundle. There is no practical method by which a tube bundle may be cleaned economically that will assure that all such metal particles are removed. Should a tube bundle containing metal particles be reused in an engine, subsequent premature failure may result even though the engine has otherwise been properly cleaned and repaired. The conventional approach toward attempting to solve this problem has been to design the oil cooler to be more easily cleaned by making the end caps and tube bundle removable from the cooler housing. This has led to increased cooler weight and expense and has required service personnel to make a judgment as to whether the tube bundle could be adequately cleaned. When a decision is made, incorrectly, to reuse a tube bundle contaminated with metal particles, premature engine failure and excessive warranty costs can result.

Prior art lubrication fluid cooling systems, such as those disclosed in U.S. Pat. Nos. 2,623,612; 3,223,197; 3,561,417 and 3,741,342, perform their intended function adequately as long as the cooler portion is painstakingly cleaned and the filters are changed or cleaned frequently to eliminate the possibility of metal fragments and other impurities circulating throughout the engine lubrication system. Maintenance of this type can be both difficult to perform and costly when carried out on a regular basis.

The system disclosed in U.S. Pat. No. 2,623,612 first calculates oil either to the cooler or, if the pressure exerted by the oil is above a predetermined level, to a short-circuiting duct and then through a single filter prior to directing it to the engine. While the cooler in this assembly is compactly mounted beneath a lateral extension of the upper engine casing, the oil filter is mounted awkwardly beyond one end of the engine. The system disclosed in U.S. Pat. No. 3,561,417 describes a lubrication fluid flow system which directs oil in a first direction through the cooler to a filter and from the filter to the engine. No provision is made for maintaining a flow of lubrication fluid to the engine in case of a filter malfunction or nonfunction due to blockage.

The lubrication fluid cooling and filtering circuit disclosed in U.S. Pat. No. 3,741,342 is designed to maintain uniform oil gallery pressure and provides for the flow of oil first through a cooler and then either through a pair of filters or through a bypass valve before being directed to the engine. An alternate flow path directs lubrication fluid through a cooler and back to the pan when the pressure exceeds a certain level. All lubrication fluid passing through the pair of filters disclosed therein is directed to the engine lubrication circuit. There is no direct fluid connection between the pair of filters and the oil pan; therefore, the lubrication fluid directed to the pan in this system will contain any impurities contained by the cooler. Failure to maintain the cooler absolutely free from bits of metal or other contaminants could result in these impurities being directed to the pan with the lubrication fluid and recirculated to the cooler and the rest of the engine. If such a buildup of contaminants causes the cooler to become blocked so that the flow of oil therethrough is reduced or diminished and the cooler is not cleaned properly or replaced immediately, serious engine problems resulting from insufficient or no oil directed to the engine are highly likely to occur. While the lubrication fluid filtering and cooling system described in U.S. Pat. No. 3,223,197 would provide for the flow of oil to the engine in the event of a blocked filter, this system does not provide a secondary safeguard filter integrally mounted with a primary filter to filter at least a portion of the circulating lubrication fluid.

The need for an auxiliary bypass filter which continuously filters engine oil despite complete blockage of the main filter operates as a further impediment to attainment of a low cost, highly reliable and compact filter/cooler assembly.

DISCLOSURE OF INVENTION

The basic object of this invention is to overcome the disadvantages of the prior art as discussed above and, in particular, to provide a lubrication fluid filtering and cooling assembly for an internal combustion engine equipped with internally contained lubrication circuits having a pair of lubrication fluid filters and a lubrication fluid cooler which are simultaneously and integrally mounted on the engine block by single mounting bracket including inlet and outlet ports fluidically connected with the engine lubrication fluid outlet and inlet ports. The mounting bracket provides for the simultaneous flow of the major portion of the lubrication fluid to a main full flow filter and then to a cooler and to the engine lubrication circuit or, alternatively, in the event the main filter is blocked, through a bypass valve and then to the cooler prior to entering the engine lubrication circuit. A predetermined minor portion of the lubrication fluid is directed at all times to a bypass filter and directly back to the oil pan.

It is another object of the present invention to provide a low cost lubrication fluid cooler constructed in a manner which prevents nondestructive disassembly of the cooler and makes replacement of the cooler both necessary and economically feasible during engine overhaul.

It is a more specific object of this invention to provide an oil cooler including a hollow shell within which are mounted a plurality of coolant flow tubes by support plates having axially extending flanges which telescopically receive the lip of a pair of cup shaped end caps wherein the lips of the pair of end caps form butt joints with the ends of the hollow shell, respectively, and further wherein the shell, plate and cap at each end are simultaneously joined by a single circumferential weld of the butt joint and subjacent portion of the axial flange.

It is yet another specific object of this invention to provide a mounting bracket for a cooler/filter assembly adapted for use in an internal combustion engine having an outwardly and downwardly extending lateral side wall containing a main oil discharge port for discharging oil from the engine block, a main oil return port for receiving a portion of the oil discharged through the discharge port for distribution throughout the engine and an auxiliary oil return port for receiving a separate portion of the oil discharged through the discharge port for direct return to the oil pan. The bracket includes an upper side upon which is mounted an oil cooler and a lower side upon which is mounted main and bypass filters and further includes a pair of mounting flanges containing flow passages for fluidically connection with the engine inlet and outlet ports wherein the mounting flanges are arranged at an oblique angle with respect to the upper and lower sides of the bracket body to permit the oil cooler to be offset toward the engine block.

It is yet another object of the present invention to provide a compact lubrication fluid filtering and cooling assembly which has a low profile conforming to the shape of the engine block and includes an offset cooler mounting structure which permits the attachment of the cooler to the engine within a minimal amount of space.

It is yet another object of the present invention to provide a lubrication fluid filtering and cooling assembly which includes a fluid flow circuit having a bypass filter and a direct return to the oil pan so that all lubrication fluid entering the pan through this circuit is filtered, thus preventing the buildup of impurities in the lubrication fluid. The bypass filter may be designed to provide a finer degree of filtering since the mounting bracket contains a metering passage arranged to cause the bypass filter to operate at a much lower volumetric flow rate than does the main flow filter.

Still other and more specific objects of the subject invention may be appreciated by consideration of the following Brief Description of the Drawings and the following description of the Best Mode for Carrying Out the Invention.

BEST MODE FOR CARRYING OUT THE INVENTION

The lubrication filtering and cooling assembly of the present invention has been designed to be mounted on the main frame (including the block) of an internal combustion engine equipped with an internally contained lubrication circuit. The structure of the engine main frame which may include a block and ladder frame and which further includes lubrication fluid outlet and inlet ports for communication with the engine lubrication circuit, is disclosed in copending application Ser. No. 22,647, filed Mar. 21, 1979 and assigned to the assignee of the present application, the disclosure therein being hereby incorporated by reference. As will be described in more detail below, the present lubrication fluid filtering and cooling assembly is compact and can be mounted close to the engine frame to achieve a low profile generally corresponding to the profile of the engine frame.

Figure 1:
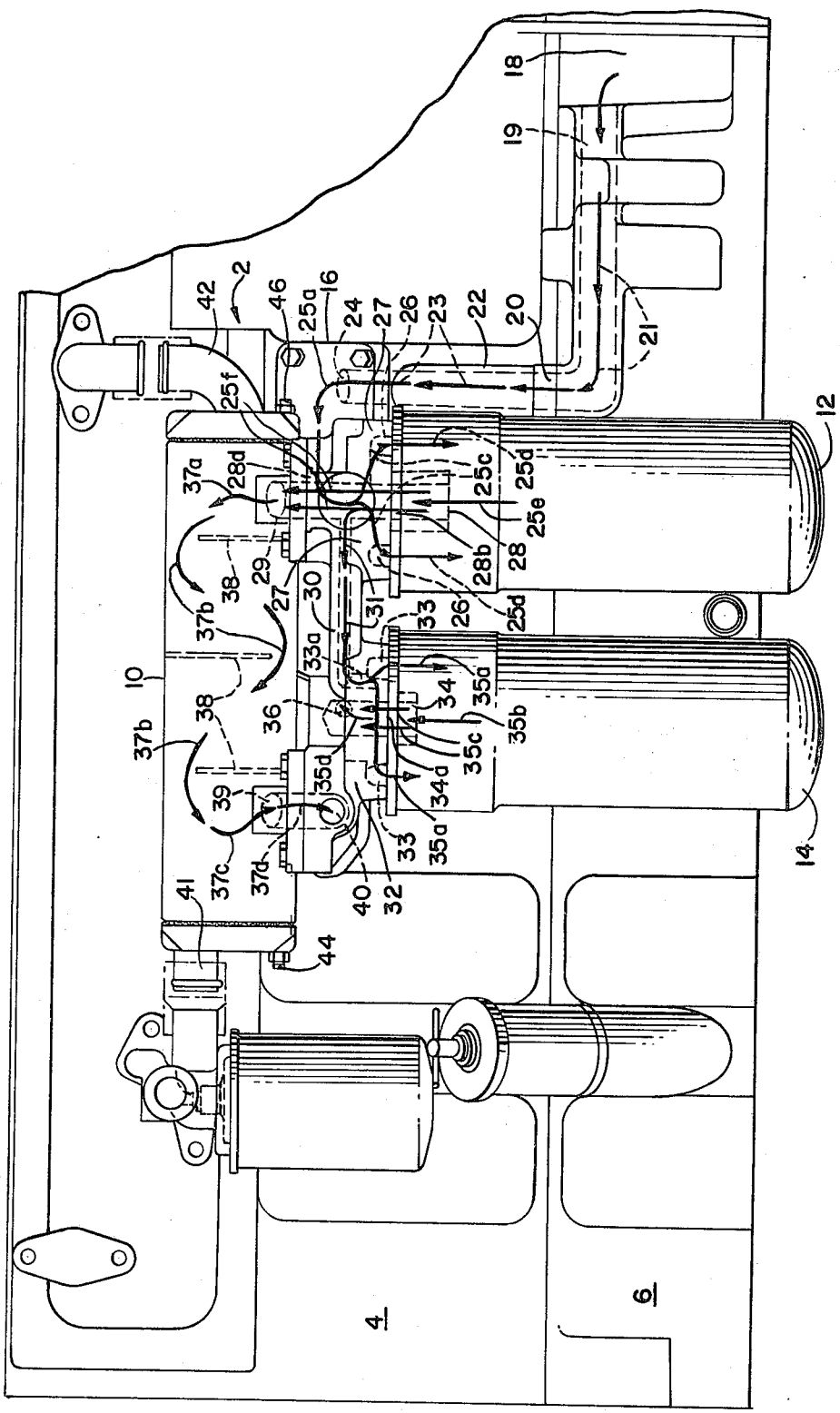
FIG. 1 is a side elevational view of the lubrication fluid filtering and cooling assembly of the present invention mounted on an engine block.

Referring now to FIG. 1, the present lubrication fluid filtering and cooling assembly 2 of the present invention is shown mounted on the engine block 4. Engine block 4 is connected with a ladder frame 6 to which an oil pan (not shown) is normally attached. The assembly includes an oil cooler 10, a pair of filters 12 and 14 and bracket 16, the structure of which will be explained in greater detail hereinbelow.

The flow of lubrication fluid from the pump and through the assembly is best understood with reference to FIG. 1. Oil from the lubrication system sump (not shown) is discharged under pressure from pump 18 into passage 19 in the engine ladder frame 6 to engine lubrication fluid inlet 20. Arrows 21 represent the passage of lubrication fluid from pump 18 to inlet 20 in the engine block. The locations of pump 18 and passage 19 relative to the sump and the engine block are discussed in detail in copending application Ser. No. 90,478, filed Nov. 1, 1979 and assigned to the assignee of the present application, the disclosure therein being hereby incorporated by reference. Further details of pump 18 and passage 19 are disclosed in copending application entitled GEAR PLATE ASSEMBLY FOR MOUNTING AND POSITIONING AN ACCESSORY DRIVE TRAIN, Ser. No. 104,914, filed Dec. 18, 1979 and assigned to the same assignee as the present application, the disclosure therein being hereby incorporated by reference.

Once within the engine block, lubrication fluid is conducted through engine block passage 22 along the path shown by arrows 23 through main discharge port 24 into the cavity formed, in part, by a flange of bracket 16, as shown by arrow 25a. Fluid then enters a horizontally oriented passage (not shown) in bracket 16 which communicates with a first discharge port 26 for discharging oil into an annular oil filter inlet in filter 12 which connects with bracket 16 by means of a filter head attachment 27. Arrows 25c illustrate this flow path. Fluid next proceeds downwardly as shown by arrows 25d through the main full flow lubrication fluid filter 12 and then upwardly, as shown by arrows 25e through a first inlet port 28b in bracket 16 for receiving filtered oil through filter outlet port 28 and into the flow passage which communicates with inlet port 29 of the oil cooler 10, as shown by arrows 25f. If full flow filter 12 becomes blocked thereby preventing the flow of lubrication fluid therethrough a pressure actuated fluid circuit which bypasses filter 12 is provided, as will be explained in greater detail hereinbelow.

A predetermined portion of the lubrication oil entering filter head attachment 27 is diverted to an auxiliary or bypass filter 14 through bleed passage 30 which is fluidically connected with an annular discharge port 33 (referred to hereafter as a third discharge port) in filter head attachment 32, which connects filter 14 to bracket 16. Connecting passage 33a provides the fluid connection between bleed passage 30 and discharge port 33. The proportion of the total flow through main discharge port 24 received for passage through filter 14 is determined primarily by the size of connecting passage 33a. Arrows 35a represent the flow of lubrication fluid through discharge port 33 and into filter 14, and arrow 35b shows the upward fluid flow as it exits central filter outlet 34, into an inlet port 34a (referred to hereafter as a third inlet port of bracket 16). Arrows 35c represent the flow of fluid into inlet port 34a of bracket 16, and arrow 35d represents flow from the bracket body through port 36 which communicates with an auxiliary oil port in the engine block (not shown).

The type of filter preferred for use as the full flow filter 12 of the present invention is the type of commercially available replaceable filter conventionally used on heavy duty internal combustion engines and referred to as a "spin on" filter. Bypass filter 14 can be of the same type as filter 12, but should preferably contain a finer filter element than filter 12. The utilization of such a filter to filter a portion of the lubrication fluid conveyed to the sump has been found to reduce the accumulation of contaminants in the sump and, in addition, to prolong the life of the full flow filter 12.

Once lubrication fluid enters cooler 10 through inlet port 29 along the path of arrow 37a, it follows the generally serpentine path depicted by arrows 37b through the cooler around cooler baffles 38 and leaves the cooler along the path shown by arrow 37c through discharge port 39, re-enters bracket 16 as shown by arrow 37d and is then conveyed along a passage in the bracket body (not shown) and discharged through port 40 located adjacent the sidewall of the engine block. From there it enters the main engine block oil return port and passes into the engine lubrication circuit. The temperature of the lubrication fluid passing through the cooler is reduced by a constant flow of coolant from the engine cooling system which enters cooler 10 through an inlet pipe 41 and exits cooler 10 to return to the engine coolant system through an outlet pipe 42. Drains 44 and 46 are placed at opposite ends of the cooler to facilitate the removal of cooling fluid from the cooler when desired.

Figure 2:
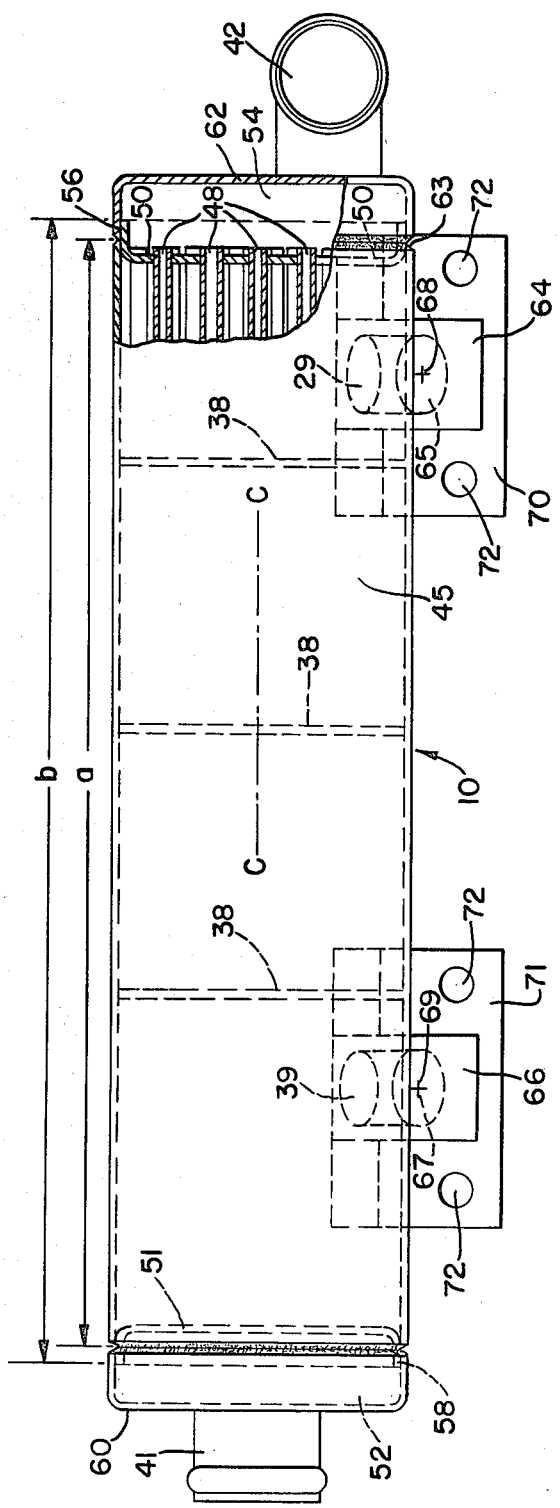
FIG. 2 is a partially cut away top elevational view of the lubrication fluid cooler illustrated in FIG. 1.

FIG. 2 illustrates lubrication fluid (oil) cooler 10 of the present invention in greater detail. Cooler 10 has been specifically designed to employ low cost fabrication techniques making it economically feasible to replace the unit upon engine overhaul. The method of manufacture also makes nondestructive disassembly impossible and thus discourages attempts to clean the cooler tubes and encourages replacement of the cooler which is the only known safe technique for insuring that residual metal particles do not find their way back into the lubrication system of an overhauled engine.

The body of the cooler of the present invention is preferably constructed from rolled sheet metal welded longitudinally into a hollow shell 45 having length a. Although the preferred shape of hollow shell 45 is the cylindrical one shown, it may be any other convenient shape which includes all the necessary structural elements for achieving the desired functional purpose. The interior of the hollow shell 45 contains a plurality of open ended elongated coolant flow tubes 48, which are positioned generally parallel to the longitudinal axis of shell 45. Coolant flow tubes 48 are supported in generally equally spaced apart parallel relationship by a pair of cup shaped tube support plates 50 and 51 mounted adjacent each open end of shell 45. As shown in FIG. 2, the ends of coolant flow tubes 48 project slightly beyond the outer surface of support plate 50 to permit the formation of a fluid tight seal between the exterior surface of each coolant tube and support plate 50 by soldering, brazing or the like. An inlet flow chamber 52 and an outlet coolant flow chamber 54 are formed by positioning a pair of end caps 60 and 62 at the coolant inlet and outlet ends of the cooler respectively. Chambers 52 and 54 are fluidically interconnected by the interiors of coolant flow tubes 48.

Support plates 50 and 51 serve an additional function beyond supporting and sealing the coolant tubes. It will be noted from FIG. 2 that the hollow shell 45 of cooler 10 has been constructed to be the length designated by a. When coolant tubes 48 and support plates 50 and 51 are inserted into shell 45, the flanges of plates 50 and 51 project beyond the end of shell 45, as shown by flange 56 on support plate 50 and flange 58 on support plate 51, increasing the effective length of the cooler shell to that designated by b. These flanges serve several important functions. They facilitate the formation of a fluid tight seal between shell 45 and support plates 50 and 51, they may assist in positioning end caps 60 and 62 during manufacture of the cooler and they contribute to the strength of the joint between end caps 60 and 62 and cooler shell 45. The joining edges of hollow shell 45 and end caps 60 and 62 are chamfered, as illustrated at point 63 in FIG. 2. When end cap 62 is telescopically positioned over flange 56, the chamfered edges of shell 45 and end cap 62 form a circumferential butt joint which permits the simultaneous joining of this butt joint and the corresponding subjacent portion of flange 56 by welding or in some like manner. End cap 60 is telescopically positioned over flange 58 and the resulting butt joint may be simultaneously joined with the corresponding subjacent portion of flange 56.

Cooler shell 45 further includes a lubrication fluid inlet port 29 and a lubrication fluid outlet port 39 in the side wall of shell 45 to provide for the flow of lubrication fluid through the cooler. Once inside shell 45, the fluid follows a generally serpentine flow path (illustrated by arrows 37b in FIG. 1) between the exterior surfaces of coolant flow tubes 48 along the axial length of the cooler in the direction from inlet port 29 to outlet port 39. Inlet port 29 and outlet port 39 are contained within a pair of mounts 64 and 66, respectively. Mounts 64 and 66 define mounting surfaces which will be explained in more detail hereinbelow. The cooler inlet port 29 and outlet port 39 open into these mounting surfaces defining openings 65 and 67, respectively, which have centroids 68 and 69 offset from an intersection line defined by the intersection of the mounting surface plane and a perpendicularly oriented plane passing through the central longitudinal axis c of shell 45. This relationship is more easily understood with reference to FIG. 3 and will be discussed in more detail hereinbelow. Openings 65 and 67 are shown to be generally oval in shape, but may be any desired shape, as long as the centroids of the openings are positioned as described above. As illustrated further in FIG. 2 mounts 64 and 66 include integral cooler mounting flanges 70 and 71, respectively. Flanges 70 and 71 each contain plural bores 72 for receiving mounting bolts (not shown) whereby the cooler unit 10 may be secured to bracket 16. The central axes of bores 72 are perpendicular to the mounting surfaces formed by mounts 64 and 66 and reside within a plane spaced from the central axis of shell 45 by a distance which is greater than the greatest radial extent of shell 45 measured in the same direction.

Figure 3:
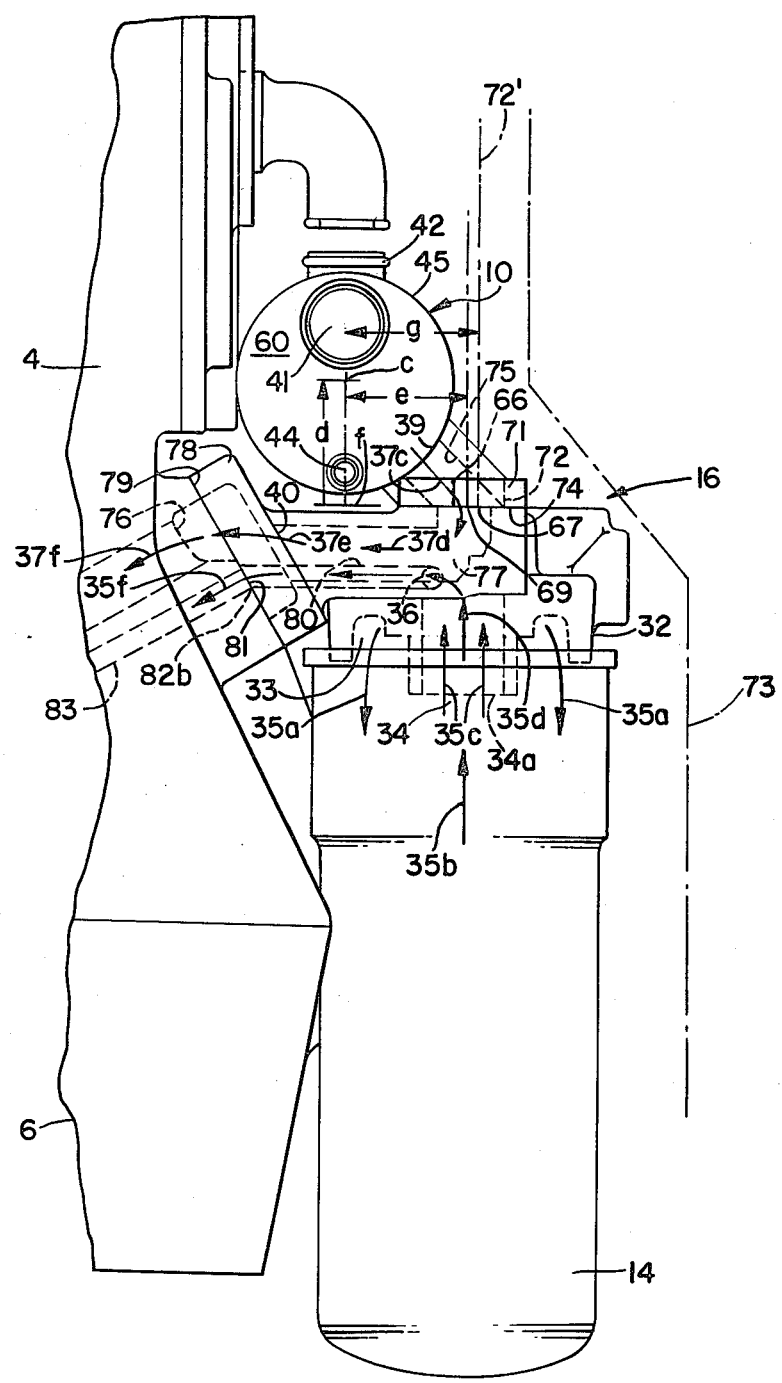
FIG. 3 is an end elevational view of the lubrication fluid filtering and cooling assembly illustrated in FIG. 1.

FIG. 3 shows an end view of the lubrication filtering and cooling assembly of the present invention and illustrates in greater detail the assembly mounting bracket 16 and, in particular, the positioning of bypass filter 14, filter head attachment 32 and cooler 10 relative to each other and to the engine block 4 and ladder frame 6. The view shown in FIG. 3 also illustrates communication of these structures with the engine lubrication circuit and the mounting of the entire lubrication fluid filtering and cooling assembly on the engine block 4 to achieve a low profile which corresponds to the engine block profile, generally depicted by dashed outline 73. The offset mounting structure utilized by the present invention allows the cooler 10 to be mounted on bracket 16 within a minimal amount of space, thus achieving the compactness desired and resulting in a cleaner engine packaging appearance.

The location of one of the mounting surfaces referred to above relative to the cooler body and mounts is illustrated clearly in FIG. 3. Mounting surface 74, located on the underside of cooler flange 71, is positioned in a plane which is generally parallel to the central longitudinal axis c of cooler shell 45 and is spaced from the central longitudinal axis c by a distance, represented by d, which is greater than the greatest radial extent of cooler shell 45 in the same direction as distance d. Centroid 69 of cooler outlet port 67 is also offset by distance e from an intersection line f defined by the intersection of the above referred to mounting and a plane perpendicular to the mounting surface plane and passing through the central axis c.

The lubrication fluid flow path from cooler 10 to the main engine lubrication fluid inlet port 76 and the flow through the bypass filter 14 to the engine block are also illustrated in FIG. 3. Lubrication fluid leaves the cooler 10 through port 39 and follows passage 75 in the cooler mount 66, as shown by arrow 37c. The fluid exits mount 66 through outlet port 67 and enters lubrication fluid return passage 77 in bracket 16 along the path shown by arrow 37d. Following the path shown by arrow 37e, lubrication fluid leaves bracket outlet port 40 and enters the cavity formed by bracket mounting flange 78 to provide a fluid connection between return passage 77 and the engine main oil return port 76. The surface of the engine block includes engaging surface 79 shaped specifically to correspond to the shape of flange 78 to form a fluid tight seal. A second engine block engaging surface (not shown) corresponds to the second bracket mounting flange (not shown) at the opposite end of bracket 16. The positioning of this second engine block engaging surface will be discussed in more detail hereinbelow.

FIG. 3 discloses yet another advantage of positioning the mounting flanges (only flange 71 being shown in FIG. 3) in an offset manner by showing bolt receiving bore 72 in a position in which the central axis thereof resides is a plane (represented by line 72′) perpendicular to the plane defined by surface 74 and parallel to but spaced from the central axis c of cooler 10 by a distance (g) which is greater than the greatest radial extent of shell 45 measured in the same direction. This arrangement of connecting bolt receiving bores 72 (only one of which is illustrated in FIG. 3) allows for the mounting flanges (only flange 71 being illustrated in FIG. 3) to be formed closely adjacent the hollow shell 45 of cooler 10 while at the same time allowing the connection bolts to be inserted and removed easily from bores 72. Moreover, by offsetting mounts 64 and 66, cooler 10 may be mounted toward the engine block, and the inlet and outlet ports for cooler 10 may be contained in the mounts 64 and 66 (FIG. 2) such that openings 65 and 67 align with corresponding openings in bracket 16 positioned in a manner to simplify the configuration of flow passages in bracket 16. Referring back to FIG. 1, the first inlet port 28b of bracket 16 is connected to the discharge port 28d of bracket 16 which feeds oil into cooler 10 (referred to hereafter as the second discharge port of bracket 16) by means of a straight passage (referred to hereafter as the second passage of bracket 16). Because the first inlet port and the second discharge ports of bracket 16 are vertically aligned, the connecting passage (second passage of bracket 16) may be vertically oriented, requiring a total length no greater than the vertical thickness of the bracket 16.

FIG. 3 further illustrates in more detail the flow of lubrication fluid into and out of auxiliary or bypass filter 14. As described in conjunction with FIG. 1, lubrication fluid enters filter 14 from discharge port 33 (referred to hereafter the third discharge port of bracket 16) as shown by arrows 35a, and leaves through central filter outlet 34, as shown by arrows 35b, which communicates with inlet port 34a (referred to hereafter as the third inlet port of bracket 16). The fluid then follows the paths of arrows 35c and 35d and is conducted through port 36 in bracket 16 and through auxiliary passage 80 to auxiliary port 81 in bracket flange 78. Auxiliary port 81 communicates with an engine block auxiliary oil port 82b where lubrication fluid, following the path shown by arrow 35f, enters an engine auxiliary oil return passage 83 and is then conducted directly to the oil pan sump (not shown) without passing through the engine lubrication circuit to which port 76 is connected.

Figure 4:
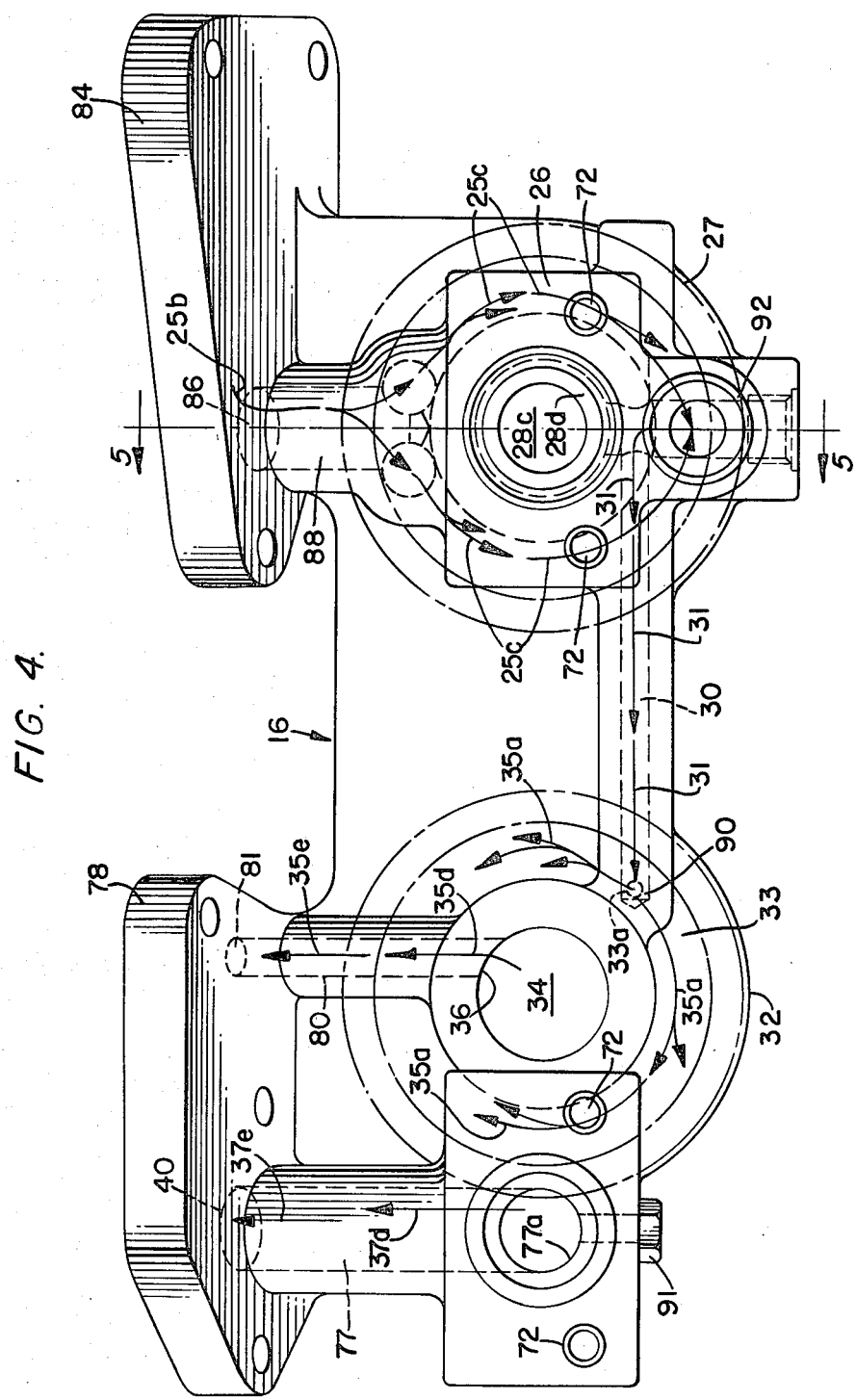
FIG. 4 is a top elevational view of a mounting bracket for use in the filtering and cooling assembly of the invention.

FIG. 4 illustrates bracket 16 as it would appear when viewed from above with cooler 10 removed. Fluid flow through the bracket passages can be clearly seen. Lubrication fluid from the main oil discharge port (not shown) enters first passage 88 in bracket 16 through an open end of first passage 88 contained in bracket flange 84 as shown by arrow 25b. From there lubrication fluid enters an annular discharge port (referred to as first discharge port) 26, is conducted along the path represented by arrows 25c into main filter 12 and is filtered through the filtering element of filter 12 (not shown) prior to being conveyed out of filter 12 through central filter outlet port (not shown) which communicates with a first inlet port 28b (not shown) on the lower side of bracket 16 for delivery to the oil cooler through a second passage 28c and discharge port 28d (second discharge port of bracket 16).

At the same time fluid is filtered by filter 12, a predetermined portion of the lubrication fluid is diverted from second discharge port 28c into bleed passage 30 along the path shown by arrows 31 into connecting passage 33a and third discharge port 33 (not shown). The preferred configuration shown in the drawings diverts about 10% of the total lubrication fluid flow into the assembly through passages 30 and 33a to the auxiliary or bypass filter 14. Lubrication fluid flows through third discharge port 33 following the path shown by arrows 35a, is filtered by auxiliary filter 14 and leaves central filter outlet 34 to enter the third inlet port 34a of bracket 16, as shown by arrow 35d. From there it flows through a fourth passage 80, as shown by arrow 35e, and leaves the bracket through auxiliary return port 81 contained in flange 78 which communicates with the engine lubrication circuit leading to the sump (not shown). After being conveyed from cooler 10, lubrication fluid enters third passage 77 in bracket 16 through third inlet port 77a along the path shown by arrow 37d and leaves the third passage 77 through one end 40 contained in bracket flange 78. From there the filtered and cooled lubrication fluid enters the main oil return port of the engine block (not shown) for circulation to the engine lubrication circuit.

The passage 77 may also include an additional discharge fitting 91 to provide a supply of oil to an engine turbocharger.

Figure 5:
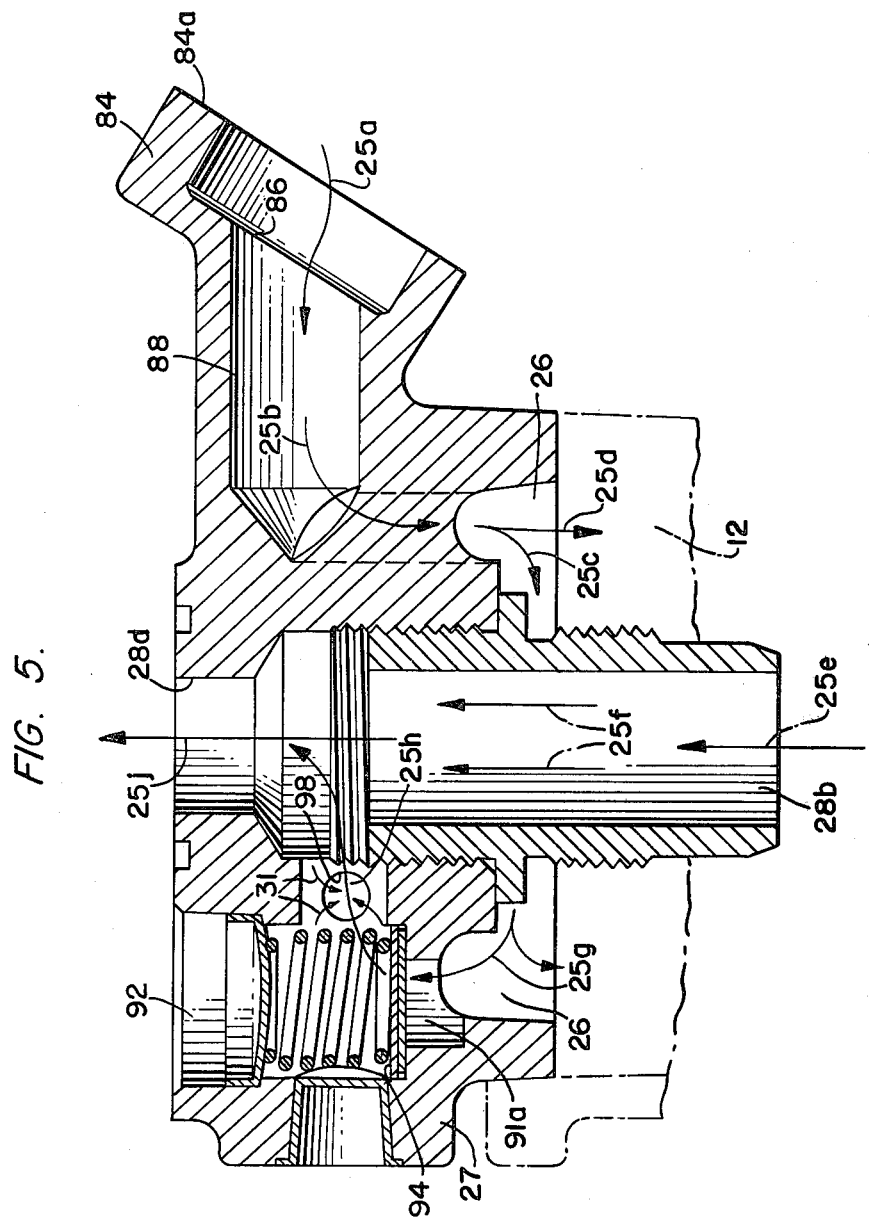
FIG. 5 is a cross sectional view of the mounting bracket illustrated in FIG. 4 taken along lines 5—5 of FIG. 4.

If the main full flow filter 12 is blocked so that it can no longer function properly, an additional fluid flow passage (fifth passage) is provided which directs lubrication fluid entering the bracket 16 to the cooler, bypassing filter 12. The portion of the lubrication fluid usually diverted to auxiliary filter 14 continues to be so diverted, resulting in the filtration of at least some of the fluid in the total engine lubrication circuit. Reference is now made to FIG. 5, wherein fifth passage 91a is illustrated interconnecting first discharge port 26 with the second discharge port 28d. A pressure actuated bypass valve 92 is positioned within fifth passage 91a. When main filter 12 is blocked, the pressure of the lubrication fluid in first discharge port 26 increases. Blockage of a substantial portion of the filter element will increase the fluid pressure enough to open spring biased valve element 94, directing the fluid flow out of first discharge port 26 along the path shown by arrow 25g, through the valve, as shown by arrow 25h and out of the second discharge port 28d of bracket 16 as shown by arrow 25j. The lubrication fluid then enters inlet port 29 of cooler 10 and follows the flow path described hereinabove to provide cooled, but unfiltered lubrication fluid to the engine lubrication system. The provision of this safeguard fluid circuit prevents the severe engine problems which would otherwise accompany a loss of lubrication fluid due to a blocked filter.

FIG. 5 also illustrates the connection port 98 between bleed passage 30 and second discharge port 28d, whereby lubrication fluid is diverted, as shown by arrows 31, to auxiliary filter 14. One of the mounting flanges 84 which serves to hold bracket 16 on the engine block is disclosed in cross section in FIG. 5. As is clearly illustrated flange 84 includes an engine block engaging surface 84a for contacting a corresponding engaging surface on the engine block (not illustrated). Flange 78 includes a similarly oriented block engaging surface (not shown). Block engaging surface 84a is oriented obliquely with respect to the upper surface of bracket 16 containing the second discharge port 28d and second inlet port 77a and with respect to the lower surface of bracket 16 containing both full flow and auxiliary inlet and discharge ports (26, 28b, 33 and 34a). The oblique angles are such that the upper and lower surfaces of bracket 16 are normally horizontal when the bracket is mounted on the sidewall of an internal combustion engine having the sidewall oriented at the same oblique angle with respect to the horizontal when the engine is in its normal operating position.

Figure 6:
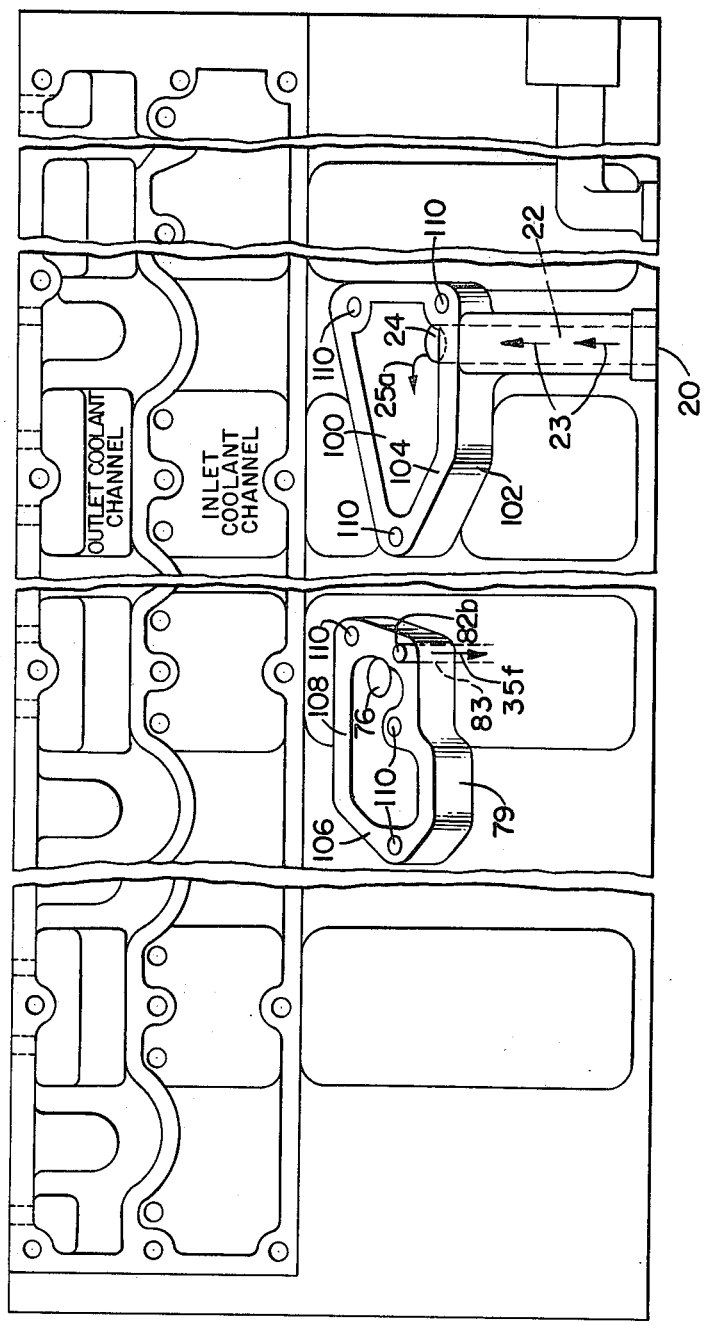
FIG. 6 is a side elevational view of an engine block of FIG. 1 showing the lubrication fluid filtering and cooling assembly engine mounting projections and the engine lubrication circuit outlet and inlet ports with which the filtering and cooling assembly of this invention are operatively associated.

The configuration of the portion of the engine block which connects with the engine block engaging surfaces formed on flanges 78 and 84 of bracket 16 and the positions of the main oil discharge port 24, main oil return port 76 and auxiliary port 82b is illustrated in FIG. 6. Passage 22, which directs lubrication fluid from the pump along the path shown by arrows 23, as discussed hereinabove, terminates at engine main oil discharge port 24 positioned within a cavity 100 formed by bracket flange engaging surface 102. Engaging surface 102 is formed on the outer extremity of a lip 104 surrounding cavity 100 and shaped to receive corresponding flange 84 of bracket 16 and to form a fluid tight seal therewith. Engaging surface 79 is similarly formed on the outer extremity of a lip 106 surrounding a cavity 108 and shaped to receive corresponding flange 78 of bracket 16 and form a fluid tight seal therewith. It should be noted that the shapes of flanges 78 and 84 and engaging surfaces 79 and 102 differ to accomodate the positions of the main oil discharge port and the main return and the auxiliary inlet port 82b. For example engine engaging surface 79 surrounds cavity 108 in which is located the main return port 76. Engaging surface 79 includes, in addition, auxiliary inlet port 82b which directs lubrication fluid entering it through passage 83, as shown by arrow 35f, to the engine oil pan (not shown). Passage 80 shown in FIGS. 3 and 4 provides the necessary fluid connection between the auxiliary or bypass filter 14 and auxiliary inlet port 82b so that lubrication fluid directed into passage 80 reaches the sump. Suitably drilled holes 110 in the engine engaging surfaces 79 and 102 and in the corresponding mounting assembly flanges (not shown) receive bolts (not shown) to secure the mounting assembly, cooler, filter heads and filters to the engine block in the unique offset mounting disclosed herein.

INDUSTRIAL APPLICABILITY

The lubrication fluid filtering and cooling assembly of the present invention will be utilized primarily in internal combustion engines equipped with the internally contained lubrication circuit described. Such engines are commonly used in many applications from heavy over-the-road construction vehicles to automotive and marine applications. It is anticipated that the replaceable lubrication fluid cooler will be widely used to assure the cleanest possible lubrication fluid filtering and cooling after an engine overhaul, thus prolonging engine life by reducing or eliminating the likelihood of engine problems caused by improperly cleaned and maintained filtering and cooling systems.

We claim:

1. An oil cooler for an internal combustion engine having recirculating oil and coolant circuits, comprising:
   (a) an open ended, elongated hollow shell;
   (b) a plurality of open ended, elongated coolant flow tubes positioned within said hollow shell generally parallel to the longitudinal axis of said hollow shell;
   (c) a pair of tube end support plates mounted adjacent each open end of said hollow shell for supporting said coolant flow tubes in a generally equally spaced apart distribution pattern throughout the interior of said hollow shell, said support plates being connected with one end, respectively, of all said flow tubes in a manner to fluidically seal the interior surface of each said coolant flow tube from its exterior surface except for passage around the radial perimeter of said tube end support plates, each said tube end support plate including an integral circumferential flange which extends axially outwardly beyond the ends of said hollow shell when assembled therewith;
   (d) a pair of end caps shaped to be positioned adjacent the open ends of said hollow shell in a manner to form inlet and outlet coolant chambers, respectively, fluidically connected by the interiors of said coolant flow tubes, each said end cap being cup-shaped with the lip thereof being telescopically positioned over one of said integral flanges to contact directly the corresponding ends of said hollow shell and to form a butt joint with the corresponding ends of said hollow shell;
   (e) inlet and outlet oil ports positioned in the side wall of said hollow shell for forming an oil flow path within said hollow shell between the exterior surfaces of said coolant flow tubes;
   (f) inlet and outlet coolant flow ports positioned in said inlet and outlet coolant chambers, respectively, for forming a coolant flow path through said chambers and the interiors of said coolant flow tubes; and
   (g) joining means for permanently bonding the radial perimeters of said support plates with the corresponding ends of said hollow shell to fluidically seal said inlet and outlet coolant chambers along the joined radial perimeters in a manner which prevents nondestructive disassembly of said end caps and said support plates from said hollow shell, wherein the adjacent portions of said hollow shell, said end caps and said support plates are formed of heat weldable material and wherein said joining means includes a circumferential zone of weld material simultaneously joining said butt joints with the corresponding subjacent portions of said corresponding flanges.

2. An oil cooler as defined in claim 1, further including a pair of mounts connected with said hollow shell, said mounts containing said inlet and outlet oil ports and defining a pair of mounting surfaces positioned in a plane which is generally parallel to and spaced from the central longitudinal axis of said elongated shell by a distance greater than the greatest radial extent of said hollow shell in the same direction, said inlet and outlet oil ports opening into said mounting surfaces, respectively, to define a pair of openings having centroids which are offset from an intersection line defined by the intersection of said mounting surface plane and a perpendicularly oriented plane passing through the central longitudinal axis of said hollow shell.

3. An oil cooler as defined in claim 2, wherein said mounts include a pair of integral cooler mounting flanges, respectively, each said mounting flange containing plural bores for receiving mounting bolts, the central axes of said bores being perpendicular to said mounting surfaces and residing within a plane spaced from the central longitudinal axis of said hollow shell by a distance which is greater than the greatest radial extent of said hollow shell in the same direction.

4. An oil cooler as defined by claim 2, wherein the distance by which said centroids of said openings are offset from said intersection line is greater than the greatest radial extent of said hollow shell from its central axis measured in the same direction.

5. An oil cooler for an internal combustion engine assembly having recirculating oil and coolant circuits, comprising:
   (a) heat exchange means for providing fluidically separate oil flow and coolant flow paths through which oil and coolant from the engine may pass in heat exchange relationship for subsequent recirculation through the oil and coolant flow circuits, respectively, said oil cooler means including an elongated shell; and
   (b) mounting means for mounting said elongated shell on the internal combustion engine assembly, said mounting means including a pair of mounts spaced axially along the longitudinal length of said elongated hollow shell, said pair of mounts containing oil inlet and outlet ports, respectively, communicating with said oil flow path and defining a pair of mounting surfaces which directly contact the internal combustion engine assembly when said heat exchange means is mounted on the internal combustion engine assembly, said mounting surface being positioned in a plane which is generally parallel to and spaced from the central longitudinal axis of said elongated hollow shell by a distance greater than the greatest radial extent of said hollow shell in the same direction, said oil inlet and outlet ports opening into said mounting surfaces, respectively, to define a pair of openings having centroids which are offset from an intersection line defined by the intersection of said common plane and a perpendicularly oriented plane passing through the central longitudinal axis of said hollow shell.

6. An oil cooler as defined in claim 5, wherein said mounts include a pair of integral cooler mounting flanges, respectively, each said mounting flange containing plural bores for receiving mounting bolts, the central axes of said bores being perpendicular to said mounting surfaces and residing within a plane spaced from the central longitudinal axis of said hollow shell by a distance which is greater than the greatest radial extent of said hollow shell in the same direction.

7. An oil cooler as defined in claim 5, wherein the distance by which said centroids of said openings are offset from said intersection line is greater than the greatest radial extent of said hollow shell from its central axis measured in the same direction.

8. A bracket for mounting a main-flow oil filter and a bypass oil filter on the main frame of an internal combustion engine having an oil flow circuit including an oil sump and an oil discharge port through which oil exits from the main frame of the internal combustion engine for filtering, a main oil return port for receiving a portion of the oil discharged through the discharge port for distribution throughout the engine by the oil flow circuit and an auxiliary oil return port for receiving a separate portion of the oil discharged through the discharge port for direct return to the oil sump, comprising:
   (a) a bracket body containing an inlet passage for receiving all of the oil passing through the discharge port, a bleed passage for directing a predetermined portion of the oil received from the discharge port into the bypass filter at all times during engine operation, a first return passage for directing all of the oil passing through the bypass filter into the auxiliary oil return port and a second return passage for directing a portion of the oil received from the oil discharge port into the main oil return port of the engine;
   (b) a first mounting means integral with said bracket body for supporting said bracket body on the main frame in a manner to form a fluid connection between the discharge port and said inlet passage, said first mounting means incuding a first flange containing one end of said inlet passage; and
   (c) a second mounting means integral with said bracket body for further supporting said bracket body on the main frame in a manner to form fluid connections between the auxiliary oil return port and said first return passage and between the main oil return port and said second return passage, said second mounting means including a second flange separate from said first flange, said second flange containing one end of said first return passage and one end of said second return passage.

9. A bracket for mounting an oil filter having concentric inlet and outlet ports and an oil cooler having spaced inlet and outlet ports offset with respect to the longitudinal axis of the oil cooler on an internal combustion engine having a normal orientation during operation and including a main frame having separate oil and coolant flow circuits and a downwardly outwardly sloping lateral sidewall containing an oil discharge port through which oil exits from the main frame of the internal combustion engine for filtering and cooling, and a main oil return port spaced axially along the main frame from the oil discharge port for returning oil to the main frame, comprising:

(a) a bracket body having a first side containing a first discharge port for discharging oil into the oil filter inlet port and a first inlet port for receiving oil from the oil filter outlet port and having a second side opposite said first side, said second side containing a second discharge port for discharging oil into the oil cooler inlet port and a second inlet port for receiving oil from the oil cooler discharge port, said bracket body containing a first passage for conveying oil from the main frame oil discharge port to said first discharge port and a second passage for conveying oil from said first inlet port to said second discharge port and a third passage for conveying oil from said second inlet port to the main oil return port of the main frame,
   (b) bracket mounting means for mounting said bracket body on the engine frame in a position wherein said first side forms an acute angle with the portion of the lateral sidewall of the engine main frame extending downwardly from said bracket body and wherein said second side forms an obtuse angle with the portion of the lateral sidewall of the engine main frame extending upwardly from said bracket body, whereby the oil filter may be mounted in a generally perpendicular orientation on said second side and said oil cooler may be mounted on said first side in an offset manner toward the main frame of the engine.

10. A bracket as defined in claim 9, wherein said bracket mounting means includes a first flange containing one end of said first passage and a second flange, separate from said first flange, containing one end of said third passage, said first and second flanges having engine sidewall engaging surfaces for forming a fluid tight seal with the engine side walls around the oil discharge port and the oil return port, respectively, said engine sidewall engaging surfaces being oriented at an oblique angle with relation to said first and second sides of said bracket body to cause said first and second sides to reside generally in horizontal planes respectively when said bracket body is mounted on the engine and the engine is in its normal operating orientation.

11. A bracket as defined in claim 10, wherein said bracket body contains a third discharge port for discharging oil into an auxiliary oil filter and a third inlet port for receiving oil from an auxiliary oil filter, a said bracket body further containing a bleed passage for conveying oil from said second discharge port to said third discharge port at all times during engine operation and a fourth passage for conveying oil from said third inlet port back to the engine separately from the main oil return port.

12. A bracket as defined in claim 11, wherein said bracket body contains a fifth passage for conveying oil from first discharge port to said second discharge port without passing through the oil filter connected with said first inlet and first discharge ports and wherein said bracket body includes a bypass valve means within said fifth passage for normally maintaining said fifth passage closed except when the oil pressure differential between said first and second discharge ports reaches a predetermined level at which time said fifth passage is opened to bypass oil around the oil filter connected with said first inlet and first discharge ports.

13. An oil cooling and filtering assembly for an internal combustion engine including a main frame having separate oil and coolant flow circuits and a downwardly outwardly sloping lateral sidewall containing an oil discharge port through which oil exits from the main frame of the internal combustion engine for filtering and cooling, and a main oil return port spaced axially along the main frame from the oil discharge port for returning oil to the main frame after it has passed through an oil filter having a centrally located oil filter outlet port for discharging filtered oil positioned at one end and an annular oil filter inlet for receiving unfiltered oil positioned concentrically with respect to said oil filter outlet port, comprising:

(a) oil cooler means for providing fluidically separate oil flow and coolant flow paths through which oil and coolant from the engine may pass in heat exchange relationship for subsequent recirculation through the oil and coolent flow circuits, said oil cooler means including an elongated shell and a pair of mounts spaced axially along the longitudinal length of said elongated hollow shell, said pair of mounts containing oil cooler inlet and outlet ports, respectively, communicating with said oil flow path and defining a pair of mounting surfaces positioned in a plane which is generally parallel to and spaced from the central longitudinal axis of said elongated hollow shell by a distance greater than the greatest radial extent of said hollow shell in the same direction, said oil cooler inlet and outlet ports opening into said mounting surfaces, respectively, to define a pair of openings having centroids which are offset from an intersection line defined by the intersection of said common plane and a perpendicularly oriented plane passing through the central longitudinal axis of said oil cooler; and (b) bracket means for mounting said oil cooler means on the engine main frame in fluid communication with the oil flow and coolant flow circuits of the engine and the oil filter, said bracket means including:

(1) a bracket body having a first side containing a first discharge port for discharging oil into the oil filter inlet port and a first inlet port for receiving oil from the oil filter outlet port and having a second side opposite said first side, said second side containing a second discharge port for discharging oil into said oil cooler inlet port and a second inlet port for receiving oil from said oil cooler discharge port, said bracket body containing a first passage for conveying oil from said first inlet port to said second discharge port and a third passage for conveying oil from said second inlet port to the main oil return port of the main frame, (2) bracket mounting means for mounting said bracket body on the engine main frame in a position wherein said first side forms an acute angle with the portion of the lateral sidewall of the engine main frame extending downwardly from said bracket body and wherein said second side forms an obtuse angle with the portion of the lateral sidewall of the engine main frame extending upwardly from said bracket body, said oil cooler means being mounted on said second side of said bracket body by said oil cooler mounts in a position to cause the central axis of said elongated shell to be displaced toward the sloping lateral sidewall whereby the cross sectional profile of said oil cooling and filtering assembly is generally similar to the cross sectional profile of the engine main frame.

14. An assembly as defined in claim 13, wherein said mounts include a pair of integral cooler mounting flanges, respectively, each said mounting flange containing plural bores for receiving mounting bolts, the central axes of said bores being perpendicular to said mounting surfaces and residing within a plane spaced from the central axis of said hollow shell by a distance which is greater than the greatest radial extent of said hollow shell in the same direction.

15. An assembly as defined in claim 13, wherein the distance by which said centroids of said openings are offset from said intersection line is greater than the greatest radial extent of said hollow shell from its central axis measured in the same direction.

16. An assembly as defined in claim 14, wherein said second side of said bracket body includes a pair of oil cooler support surfaces surrounding said second discharge port and said second inlet port, respectively, for engaging said pair of mounting surfaces, respectively, said bracket body containing plural threaded bores for receiving mounting bolts passing through said plural bores contained in said mounting flanges of said oil cooler means.

17. An assembly as defined in claim 9, wherein said second passage interconnecting said first inlet port and said second discharge port is oriented generally perpendicularly with respect to said first and second sides of said bracket body.

* * * * *